United States Patent
Longacre, Jr. et al.

(10) Patent No.: US 6,298,176 B2
(45) Date of Patent: *Oct. 2, 2001

(54) SYMBOL-CONTROLLED IMAGE DATA READING SYSTEM

(75) Inventors: Andrew Longacre, Jr., Skaneateles; Robert M. Husssey, Liverpool, both of NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/953,195

(22) Filed: Oct. 17, 1997

(51) Int. Cl.$^7$ .............. G06K 9/22; G06K 9/20; G06K 7/10
(52) U.S. Cl. .............. 382/313; 382/312; 235/462
(58) Field of Search .............. 382/313, 312, 382/321, 232; 235/462, 454, 456, 470, 472, 469, 463, 462.08, 462.04

(56) References Cited

U.S. PATENT DOCUMENTS

| | | |
|---|---|---|
| 5,039,847 | 8/1991 | Morii et al. .............. 235/379 |
| 5,120,940 | 6/1992 | Willsie . |
| 5,243,655 | 9/1993 | Wang . |
| 5,262,623 | 11/1993 | Batterman et al. . |
| 5,304,786 | 4/1994 | Pavlidis et al. . |
| 5,337,361 | 8/1994 | Wang et al. . |
| 5,399,846 | 3/1995 | Pavlidis et al. . |
| 5,471,533 | 11/1995 | Wang et al. . |
| 5,489,158 | 2/1996 | Wang et al. . |
| 5,504,322 | 4/1996 | Pavlidis et al. . |
| 5,506,697 | 4/1996 | Li et al. . |
| 5,513,017 | 4/1996 | Knodt et al. .............. 358/471 |
| 5,550,366 | 8/1996 | Roustaei .............. 235/462.34 |
| 5,557,091 | 9/1996 | Krummel .............. 235/462.08 |
| 5,591,956 * | 1/1997 | Longacre, Jr. .............. 235/462 |
| 5,635,697 | 6/1997 | Shellhammer et al. . |
| 5,644,408 | 7/1997 | Li et al. . |
| 5,710,419 | 1/1998 | Wang et al. . |
| 5,760,382 | 6/1998 | Li et al. . |
| 5,773,806 * | 6/1998 | Longacre, Jr. .............. 235/462 |
| 5,796,090 | 8/1998 | Pavlidis et al. . |
| 5,837,986 | 11/1998 | Barile et al. . |
| 5,880,453 | 3/1999 | Wang et al. . |
| 5,929,418 * | 7/1999 | Ehrhart et al. .............. 235/462 |
| 5,949,052 * | 9/1999 | Longacre, Jr. et al. .............. 235/462.08 |
| 5,974,202 | 11/1999 | Wang et al. . |
| 6,002,491 | 12/1999 | Li et al. . |

FOREIGN PATENT DOCUMENTS 0 439 682 B1 7/1996 (EP) .
0 733 991 B1 4/1999 (EP) .

* cited by examiner

Primary Examiner—Jose L. Couso
Assistant Examiner—Duy M. Dang
(74) Attorney, Agent, or Firm—Wall Marjama & Bilinski (57) ABSTRACT

The invention relates to a system for imaging a scene comprising an optical reader and a specially structured symbol configured complementarily with the reader so that when the reader reads the symbol, the reader reads image data in an image data reading region. The image reading instruction symbol of the system may include indicators for controlling various aspects of the image reading process such as the dimension of the image capture region, the relative position of the image reading region. If the image reading instruction symbol is of a type whose actual size, orientation, and distortion can be determined, scaling, orientation, and distortion characteristics determined from the image reading instruction symbol can be used to improve the image reading process. A feedback feature may be included in the reader for indicating to a user whether the reader should be moved in order to improve image reading.

31 Claims, 6 Drawing Sheets

SYMBOL-CONTROLLED IMAGE DATA READING SYSTEM

BACKGROUND OF THE INVENTION

1. Field of the Invention

The invention relates generally to imager based data collection devices and methods for using such devices; and particularly to a system including an optical reader and a specially structured symbol adapted to cause the reader to commence image data reading according to a protocol determined in part by at least one indicator of the symbol.

2. Background of the Prior Art

With increasing sophistication of imaging assemblies used in optical readers there has been a growing effort to utilize information from captured images representing indicia in areas surrounding a bar code symbol being decoded.

Various suggestions have been made in the prior art to capture and read image data representing extraneous indicia in addition to image data representing a bar code symbol subject to decoding. For example, in some applications a signature field in a known location in relation to a bar code symbol is captured, read, and output in addition to a bar code symbol. A major drawback of existing optical reader systems which suggest utilization of non-symbol image data is that these readers, generally speaking, can successfully process non-symbol image data only in the case where the non-symbol image data reading region is of a prescribed orientation and location in relation to a symbol. Furthermore, readers in such systems in general can process image data according to only one established protocol for each symbol that is read.

There is a need for a large area image capture image data reading system which can capture and process image data from an image data reading region which may be in a location in relation to a symbol that is unknown by the reader prior to reading, and which can flexibly process image data according to various types of protocols.

SUMMARY OF THE INVENTION

According to its major aspects and broadly stated the present invention is a system including a bar code reader and a specially structured image reading instruction symbol adapted to cause the reader to commence a reading of image data according to a protocol determined in part by at least one indicator of the symbol.

The bar code reader of the system may include a 2D image sensor and is preferably of a type whose operating program may be changed by capturing with the reader a specially structured bar code symbol. The symbol of the system is a 1D or 2D symbol including encoded indicia which when read by a complementarily programmed reader results in the reader processing image data according to a protocol controlled in part by at least one indicator structure of the symbol.

In one embodiment of the invention, the symbol of the system includes a plurality of image data reading indicators. A first type of image data reading indicator in the image reading instruction symbol may indicate that the symbol is an image reading instruction symbol and that there is region in space in relation to the symbol that is to be imaged by the reader; and a second type of image capture indicator at least partially encoded in the system's symbol may indicate image data reading parameters such as the dimension of the image data reading region, and the position of the image data reading region in relation to the image reading instruction symbol. When the reader reads an image data reading indicator of the first type from the capture instruction symbol, the reader reads data in an image data reading region in accordance with the parameters encoded by image data reading indicators of the second type.

In other aspects of the invention, the image reading symbol being read must be of a symbology type adapted so that the reader capturing and reading the image reading instruction symbol can determine imaging characteristics relating to the image reading instruction symbol. Such imaging characteristics which may be determined by the reader may involve, for example, the scaling of a captured symbol; an orientation of the symbol; and/or distortion characteristics of the captured image as revealed in the captured symbol. If the image reading instruction symbol and the reader of the system are appropriately configured, the reader may determine a scaling factor, an orientation factor, and distortion characteristics from the captured image reading instruction symbol.

The scaling, orientation, and distortion characteristics determined for the image reading instruction symbol can be used to determine which pixels in an original bit map representation of a scene to read in the constructing of a secondary bit map representation of a scene in which an image in an image data reading region is represented in a true size and in which distortions apparent in an original bit map representation are corrected for.

In addition to reading image data reading parameters from the image reading instruction symbol, and determining from the captured image reading instruction symbol imaging characteristics pertaining to the orientation, scaling, and distortion of the captured images, an optical reader in the system of the invention may read indicator structures from the image reading instruction symbol of a type which control an aspect of outputting image data. When read by a complementarily programmed reader, such image data output parameters may control at least one aspect of image data output. An image data output parameter may control, for example, the output location of the image data, the data formatting of outputted image data, and can also control certain aspects of processing the outputted image data. For example, an output parameter indicator may control an aspect of a character recognition algorithm in an OCR application.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF THE PREFERRED EMBODIMENTS

Figure 1:
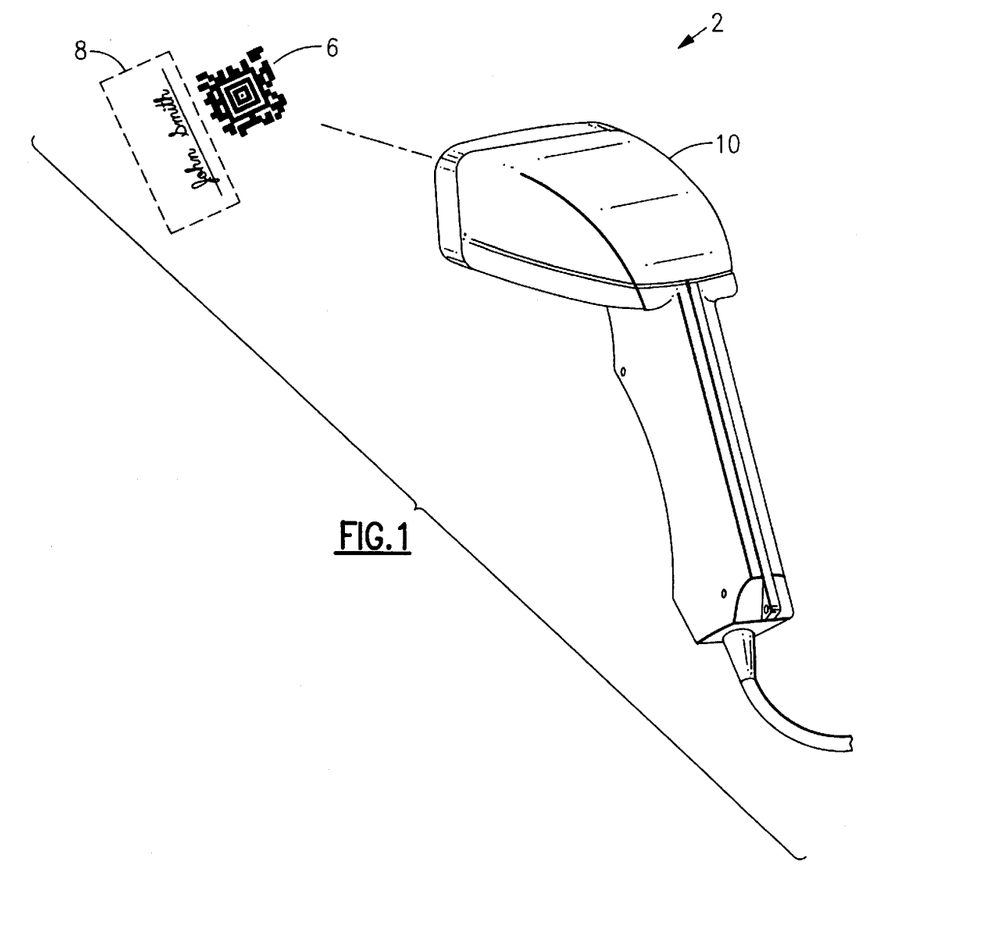
FIG. 1 is a schematic diagram of the system of the invention including an image reading symbol and a complementarily configured optical reader.

A schematic diagram of the system of the invention is shown in FIG. 1. Image data reading system 2 includes an optical reader 10 such as a bar code reader and a specially configured symbol, or indicia which shall be referred to herein as an image reading instruction symbol 6. Optical reader 10 and image reading instruction symbol are complementarily configured so that optical reader 10 reads image data representing a scene region 8 in a space after reading capture instruction symbol 6.

Image reading instruction symbol 6 may take on a variety of forms. In one embodiment, for example, the image reading instruction symbol includes a first indicator of a first type which indicates to the reader that the symbol is an image reading instruction symbol and that this reader is to commence image data reading; and at least one indicator structure of a second type indicating an image reading parameter for controlling an aspect of the image data reading process such as the dimension or position of an image data reading region. Additional operating parameter indicators may be provided to control aspects of the image capture process unrelated to the size and location of the image capture region. For example, image data reading parameter indicators may be provided to control such aspects of the image capture process as pixel resolution, gray scale depth, and color. The image reading instruction symbol may also include an output control parameter indicator structure for controlling an aspect of outputting image data. For example, an output control parameter may control the destination of outputted image data (i.e to a display device or a memory space), a data format of outputted image data, features of a displayed image such as orientation and/or size, compression algorithms utilized, and video preprocessing processes (gamma correction, contrast enhancement, edge peaking, etc.). An output control parameter may also control an aspect of image data processing subsequent to decoding. For example, an output control parameter may control an aspect of an OCR (optical character recognition) algorithm.

A plurality of image reading and/or image data reading indicator structures incorporated into an image reading instruction symbol may be substituted for by a single identification indicator structure identifying an identity of the symbol. A memory space of a reader configured to read such a symbol may have incorporated therein a lookup table including various image data reading and output parameters, which are caused to be read from memory space when the reader reads and decodes an image reading instruction symbol including an identifier indicator.

In further aspects of the image reading instruction symbol, the image reading instruction symbol may be of a symbology type adapted so that a reader reading the symbol can determine imaging characteristics relating to the image reading instruction symbol, such as the scaling of the symbol, an orientation of the symbol; and/or a distortion of the symbol.

It should be well understood to skilled artisans that the capture instruction symbol need not be of a specific symbology type or be of a symbol type at all, and that some embodiments of the invention can be practiced wherein the image reading instruction symbol can comprise virtually any combination of at least one relatively darker indicia of any shape with a relatively lighter space so long as the reader is complementary configured to respond in accordance with the invention to the reading of the image reading instruction symbol.

Figure 2:
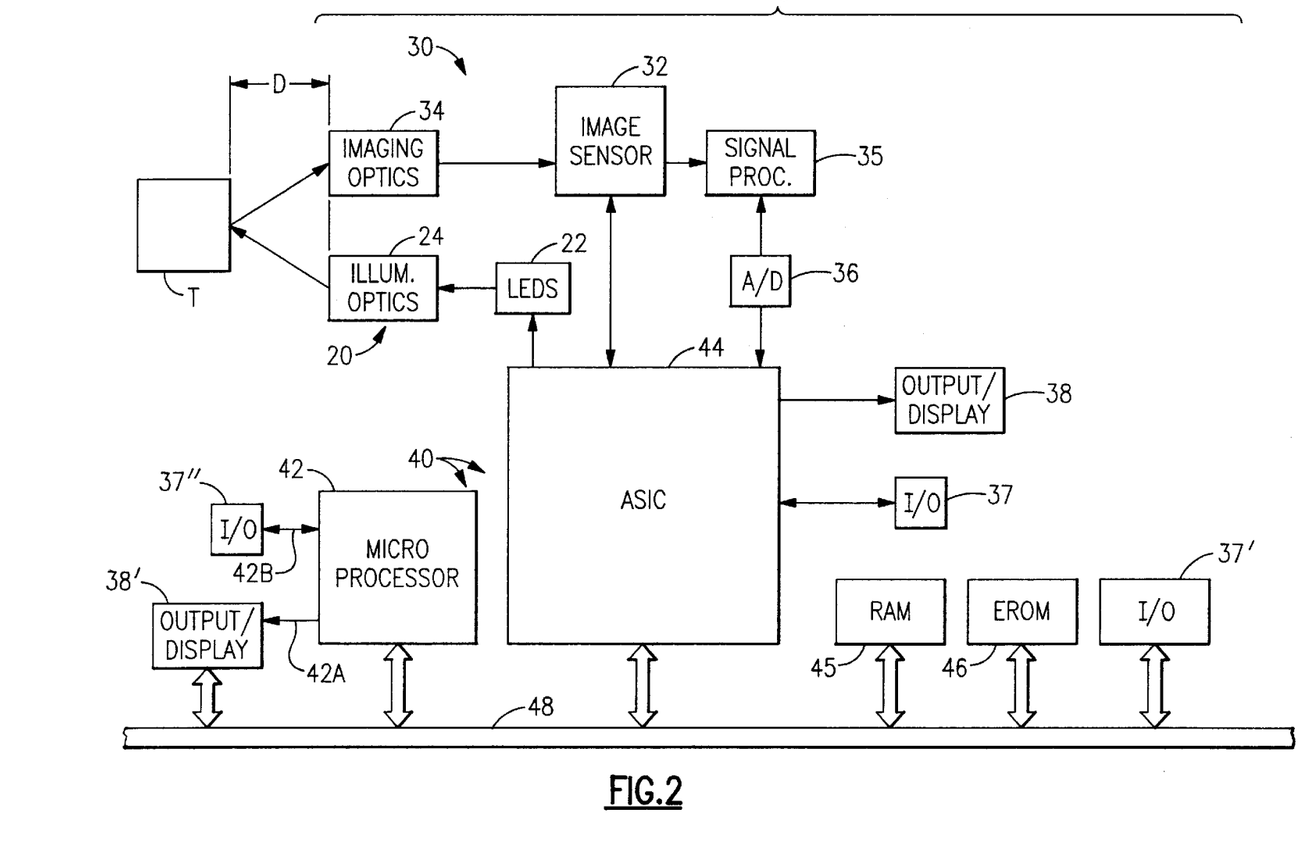
FIG. 2 is a block diagram of an optical reader of the type which may be implemented in the system of the present invention.

An optical reader of a type which may be implemented in the system of the invention is shown in FIG. 2. Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2D CCD or CMOS solid state image sensor, together with an imaging optics assembly 34 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry. The field of view of the imaging assembly 30 will depend on the application. In general, the field of view should be large enough so that the imaging assembly can capture a bit map representation of a scene including an image data reading region at close reading range. The image data reading region which is read in accordance with the invention can be read from the same bit map representation which includes the image reading instruction symbol. Alternatively, reader 10 may be caused to capture a supplementary bit map representation of a scene after decoding symbol 6 at block 118. Such a supplementary bit map representation may be useful in the case, for example, where symbol 6 is captured at block 117 in monochromatic light and it is desired to process a color image in an image data reading region. At least one additional imaging assembly (not shown) may be provided for increasing the image capture range and/or enhancing imaging capabilities of system 2.

Optical reader 10 of FIG. 2 also includes programmable controller 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of Fig.2, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, the A/D conversion process and the storage of image data, including the ability to access memories 45 and 46 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

Figure 3:
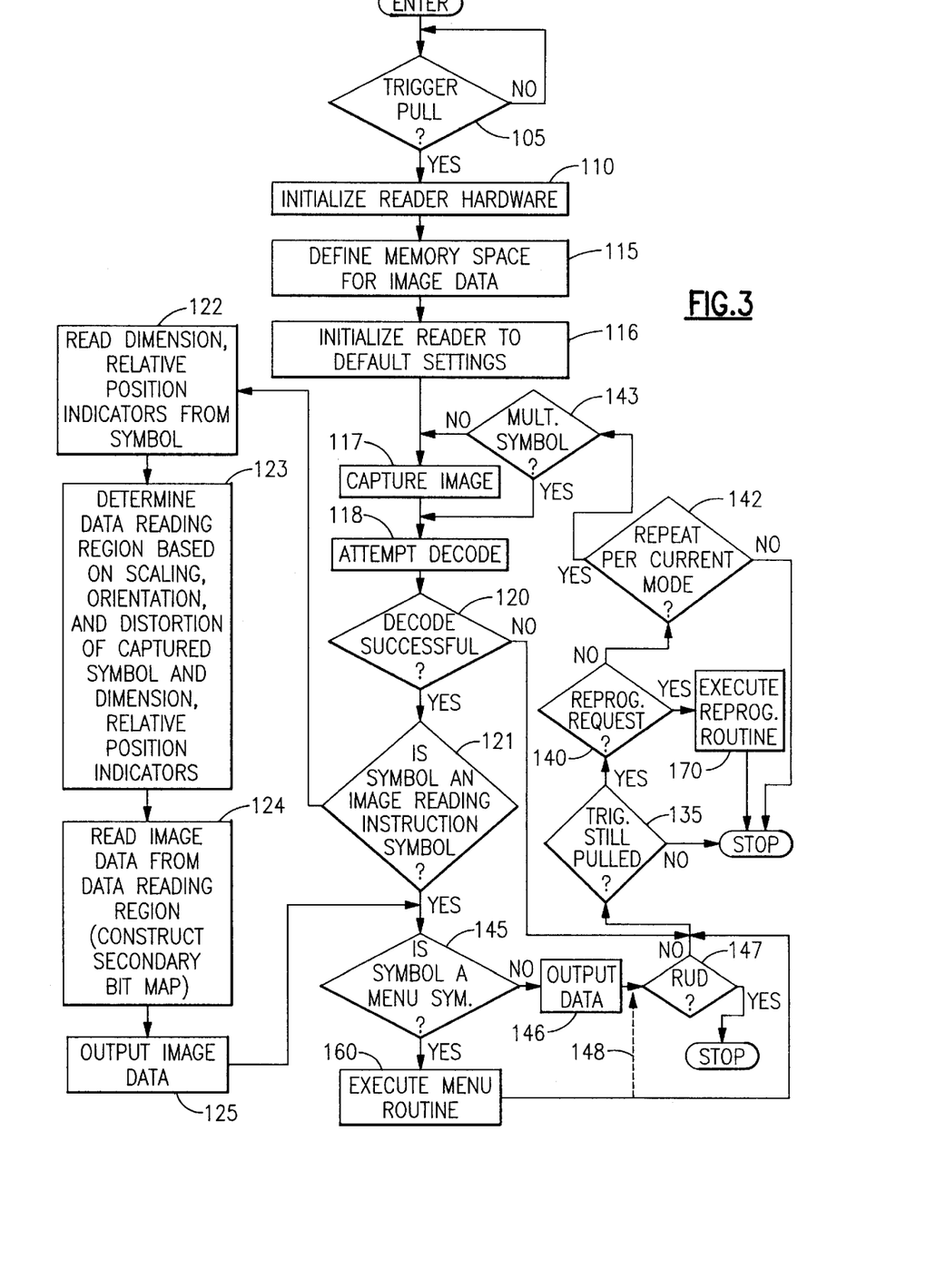
FIG. 3 is a flow diagram illustrating operation of a main program in accordance with the invention configured to commence image data reading in an image data reading region in relation to a symbol after reading the symbol.

FIG. 3 shows a flow diagram of a reader operating program configured in accordance with the invention. Steps 105 through 120 and steps 145 through 170 apply generally to one type of reader in which steps of the invention may be implemented, while steps 121 through 125 are steps that apply specifically to the symbol-controlled image data reading system of the invention. Steps 105–120 and 145–170 apply specifically to a reader sold under the tradename WELCH ALLYN 4400, and are described in detail in a copending application assigned to the assignee of the present invention entitled "Optical Readers Having Improved Reading Features", filed Sep. 3, 1996, and identified by Ser. No. 08/697,977, incorporated by reference herein. It should be understood that the operating program described herein is provided only to show, by way of example, a type operating program which may be modified in accordance with the invention and should not be taken as limiting of the varying types of optical readers in which the invention may be incorporated.

Referring to the general operational steps of the operation program shown, the operation program begins with block 105 which causes the reader to wait in a low power state until a reader trigger is pulled. When the trigger is pulled, the controller is directed to block 110 which causes it to power up and initialize the reader hardware. The controller is then directed to blocks 115 and 116 which cause it to define the image data memory space that will be used and to initialize the reader with the default values of various operating parameters governing various aspects of the operation of the reader.

Examples of such operating parameters may include, for example, the frame rate of the image sensor, the codes that will be enabled during decoding, the I/O communication protocols, beeper pitch or volume, among others. The default values of these parameters correspond to a combination of parameters which are suitable for use under most operating conditions. Additional operating parameters may control specialized functions if the reader shown such as a multiple symbol decoding function (block 143) or a repeat until done function (block 147).

After the reader has been initialized, in block 116, the processor proceeds to blocks 117 and 118, which call for it to capture and attempt to decode an image of a target symbol. The term "capturing" herein shall generally refer to a process involving processing analog signals from imaging assembly 30, converting these signals into digital form, presenting them to controller 40 and generating therefrom an initial bit map representation or other memory stored representation of the captured image. The term "reading" shall refer generally to transfers of data involving memory stored image data subsequent to a memory stored representation being initially generated in the capture step.

If a decoding is not successful (that is, if the controller is unable to determine the symbology type or information encoded in the message) then controller 40 is directed to block 117 and captures a next frame unless the reader is has been previously programmed not to repeat image capture (block 142) or receives a command to cease capturing images (135, 140).

If controller 40 is successful in decoding the symbol (block 120), then the controller 40 will be able to determine if the symbol is an image reading instruction symbol in accordance with the invention. Block 122 illustrates an operation step in the program of the invention in the case that an image reading instruction symbol includes data reading indicators indicating the dimension of the image capture region and the position in relation to the symbol of the image capture region.

If the controller 40 at block 121 determines that the symbol is an image reading instruction symbol and that the reader is to commence an image data reading step according to the invention then controller 40 proceeds to block 122 and reads image reading parameters from the symbol which in the case shown pertain to the dimension and relative position of the invention. In a simplified embodiment, such as may be the case if the image reading instruction symbol is provided in a 1D symbology then the controller at this point may be caused to capture an image in space based only on the dimension and relative position data read from the image reading instruction symbol. In one simplified embodiment of the invention, the dimension and relative position indicators read from the image reading instruction symbol correspond to pixel values. That is, dimension parameter indicators may indicate the number of pixels of image data to read in the x and y dimensions of the pixel array, and the relative position indicator parameter may indicate a pixel distance between the center of an image reading parameter and the center of an image data reading region. In this simplified embodiment, an output image data step according to the invention (block 125) would comprise reading and outputting image data from an original bit map representation of an image captured at block 125. However, such a simplified embodiment of the invention is normally significantly useful only in the case where an optical reader is positioned in a fixed position, orientation and distance from an image reading instruction symbol.

In a highly useful and versatile embodiment of the invention, the dimension and relative position indicators of the image reading instruction symbol indicate the actual dimension and relative distance, in distance units, of an image data reading region, and the reader is configured to read image data at a specific location in reference to symbol regardless the orientation or symbol to reader distance during reading.

Figure 4A:
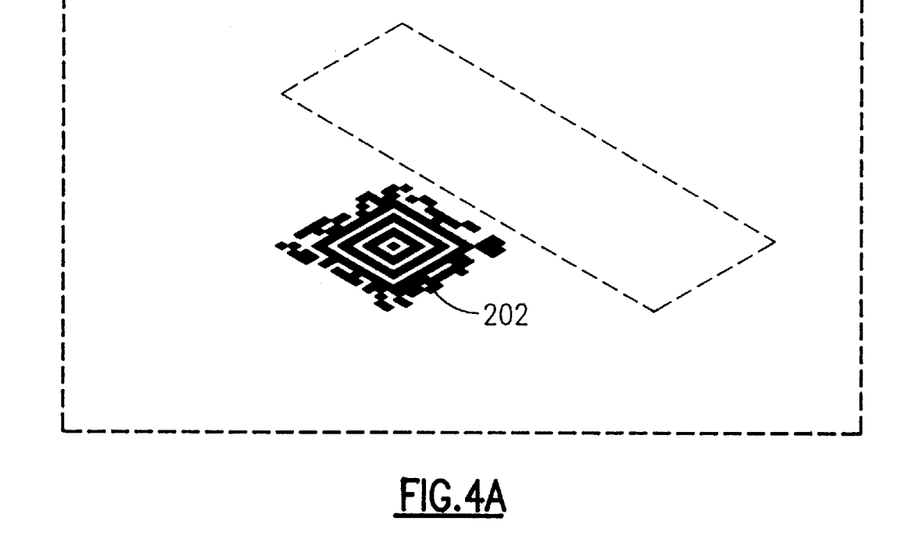
FIGS. 4A, 4B and 4C show various bit map representation graphs illustrating construction of a secondary bit map representation of an image data reading region.

FIG. 4A shows a graph corresponding to bit map image data of a captured scene including a captured image reading instruction symbol 202 captured with a reader positioned at an angle, and at an unknown distance with respect to a symbol. The symbol in the example shown includes image reading parameter indicators indicating the dimension and relative position of an image data reading region, in actual distance units. After reading at block 122 the dimension and relative position indicators determined from the decoded symbol (decoded at block 118), the reader may determine from the bit map image data, scaling characteristics, orientation characteristics, and distortion characteristics for the captured image reading instruction symbol (block 123). A scaling factor for the captured symbol can be determined, in general, by taking into account the number of modules captured, the type of symbol to determine the actual size of the modules which are normally of a standard size, and the number of pixels representing the captured image. The symbol may also include a data message corresponding to the actual size of the symbol. The orientation of the symbol can be determined based on a method which may vary depending on the symbology type. In several symbologies, at least two symbol edges include distinguishing indicia so that the relative position of the edges and orientation of the symbol can be determined. In the Aztec symbol shown, corners of central bullseye structure comprise specialized indicia (orientation patterns) for indicating the orientation of the symbol. Distortion characteristics of captured symbol 202 may be determined, for example, by taking into account the relative position of corner points A, B, C, D of the captured symbol. In many applications, data pertaining to the scale, orientation, and/or distortion characteristics of captured symbol may be previously determined by controller 40 at block 118 when controller 40 attempts to decode the image reading instruction symbol. In the case that such data has been previously determined, it would of course be unnecessary to determine the data again from the bit map representation. Instead, if scaling, orientation or distortion data has been previously determined the required data at block 122 can be determined by reading the data from a memory space of reader 10.

The substrate on which a symbol 6 may be formed may be provided by, for example, a sheet of paper, an object, or a body part. The scene region(s) desired to be captured and processed need not be located on the same substrate as symbol 6.

It will be recognized that substantially all available symbologies have predetermined geometries (normally rectangular) including corner points allowing scaling, orientation, and distortion characteristics to be determined for virtually any symbology selected for use as an image reading instruction symbol. Features of the Aztec symbology shown the various specific examples of the invention discussed herein are described in detail in U.S. Pat. No. 5,591,956 issued to the assignee of the present invention, and incorporated by reference herein.

When the scale and orientation of the captured image reading instruction symbol are determined, the reader may determine, at block 123 the boundaries of an image data reading region utilizing the dimension and relative position parameter of the image data region read from the symbol, and the scaling factor and orientation factors determined for the symbol.

Figure 4B:
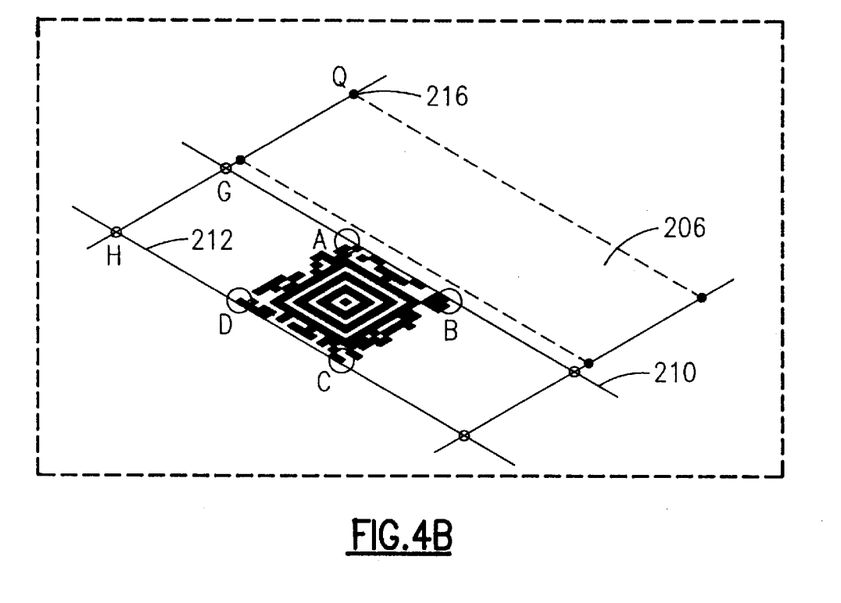
Figure 4C:
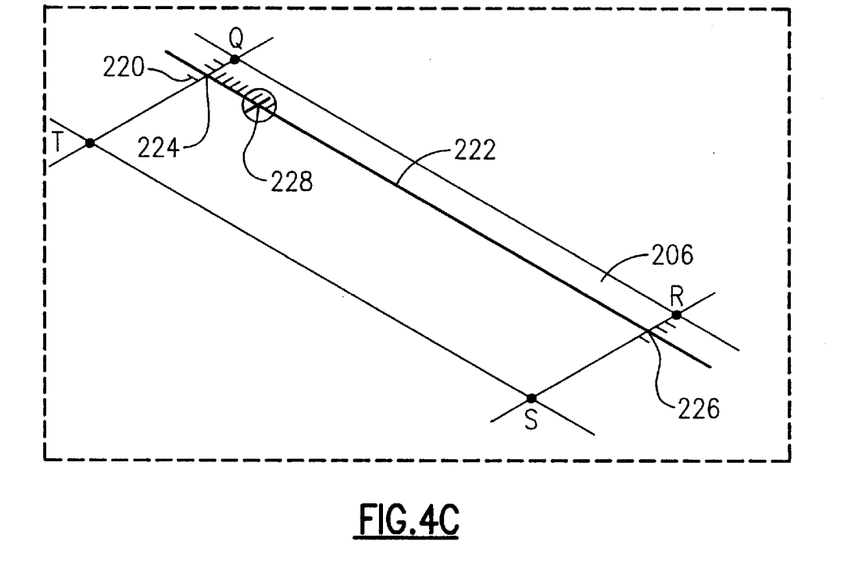

A method for reading image data of a data reading region in the case that image distortion is corrected for is described with reference to the bit map image representation graphs of FIGS. 4B and 4C. The image data region 206 determined in the example provided for the bit map representation graphs of FIGS. 4B and 4C is required by the image data reading parameters of captured symbol 202 to be above symbol 202 and of the same orientation as symbol. However, it will be recognized that an image data reading region 206 may be of any orientation, size, or shape with respect to symbol, and may include pixel values representing all or part of symbol 202. In the example provided, image data reading region 206 is defined by a dimension parameter including a height parameter and a width parameter, and a relative position parameter indicating the position of the center of the image data reading region relative to the center of symbol 202.

In order to calculate the pixel location of corner point Q defining a boundary of the data reading region, an infinite imaginary line 210 is drawn through top corner points A and B for the symbol, and infinite imaginary line 212 is drawn between bottom corner point D and C for the symbol. Temporary points G and H are then determined along imaginary lines 210 and 212 respectively, based on the scale of the symbol, the width dimension of the image reading region, and the relative position indicator of the image reading region, and infinite imaginary line 216 is drawn between the temporary points G and H. First corner mark Q for the image reading region can then be drawn along imaginary line 216 based on the relative position indicator for the image reading region and the height dimension of the image reading region. Remaining boundary points R, S, T for the image reading region are determined utilizing the same method.

When boundary points Q, R, S, and T for an image data reading region are determined (block 123), a secondary bit map representative of indicia in the image data reading region is constructed (block 124). Construction of a secondary bit map image representative of an image data reading region is described with reference specifically to FIG. 4C. The required resolution of the secondary bit map image can be encoded in an image data reading parameter of the image reading instruction symbol, or else may be encoded in the operating program of the reader. In constructing the secondary bit map image, equally spaced points 220 in the number of the resolution in the y dimension are plotted along line Q-T, and along line R-S. Imaginary pixel locator lines such as line 222 are then drawn between opposing points, for example, points 224 and 226). For determining pixel locator lines in the y dimension, equally spaced points in the number of the required resolution in the x dimension are plotted along lines Q-S, and lines T-S, and y dimension pixel locator lines are drawn between opposing points on the Q-R and T-S lines. When the imaginary pixel locator lines are drawn, a grid is formed comprising a plurality of intersecting imaginary pixel locator lines. Each point of intersection 228 of the pixel locator lines corresponds to a pixel of the constructed secondary bit map image. The value of each individual pixel in the secondary bit map image is interpolated according to one of several well known methods utilizing the pixel values from the original bit map representation of the captured image bordering the location of the intersecting lines. It is seen that a secondary bit map representation of indicia in a data reading region can be constructed so that the secondary bit map better represents the actual size and appearance of the indicia.

In accordance with further aspects of the invention, reader 10 can be configured with a feedback function which provides an indicia to a user in the event controller at block 123 determines that the reader needs to be moved into a certain position in order for the reader to capture a scene that includes an image data reading region of the size, shape and position required by symbol 6. For example, if the most recently captured original bit map representation of a scene does not include pixels required to represent the image data reading region, then controller 40 may issue a command to a component of reader 10 which emits a tone or other understandable indicator to a user to move the reader away from the target in order to expand the reader's field of view. Controller 40 can be configured to emit audible or visual indicators that correspond to the direction (x, y, or z axis) in which the reader should be moved in order to capture an image of sufficient characteristics to include image data reading region.

After the captured image of the image capture region is output at block 125, controller 40 proceeds to block 146 and outputs the encoded message of remaining data encoded in symbol, if any. Image reading instruction symbol 6 may include an encoded message or else may include no encoded message and may be provided only to cause and possibly control aspects of an image data read in accordance with the invention. Further, the image reading instruction symbol may include a single message whose only purpose is to control an image data reading according to the invention.

If at block 121, the controller determines that the symbol is not an image reading instruction symbol then the controller proceeds to block 145 and, in accordance with the specific reader operating program shown, may determine whether the symbol is a menu symbol. A reader in which the invention may be incorporated may include a menuing feature whereby aspects of reader control can be altered by reading specialized menu symbols. Menu symbols include a special flag which indicates to the reader that the symbol being read is a menu symbol. In the case that a menu symbol is read, controller 40 proceeds to block 160 and executes a menu routine. Menu symbols of the type which an image reading instruction symbol according to the invention may be embodied are described in detail in a copending application entitled "Optical Readers Having Improved Menuing Features," identified by Ser. No. 08/687,977, and incorporated by reference herein.

One embodiment of the invention, a reader can be configured to provide data read image function according to the invention by providing a menu symbol that is complementarily configured with the reader to result in an image data read.

If a symbol being read includes a flag indicating that the symbol being read is a menu symbol, then the data message of the symbol will indicate the type of menu symbol being read and possibly, data required to carry out the instruction of the operation caused to be performed by the reading of the menu symbol.

Figure 5:
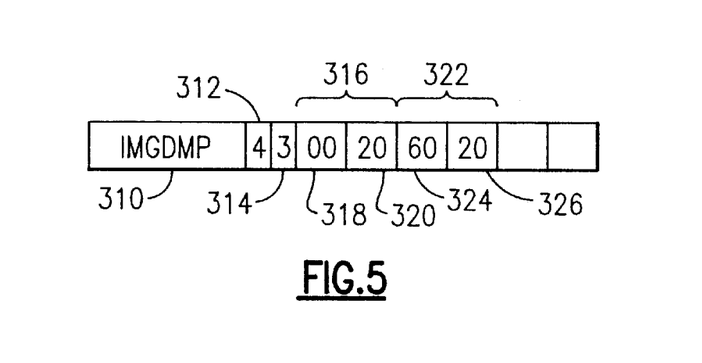
FIG. 5 illustrates a possible embodiment of a feature of the invention wherein image data reading parameters are provided in a decoded message of a menu symbol.

The basic format of a menu symbol of which one type may be a image reading instruction menu symbol is shown in FIG. 5. The image reading instruction may be provided in a message 305 separated into a plurality of sequential fields or bytes of data. In the Aztec code, data fields or bytes are read in order of concentric rings about a center bullseye.

A first data field 310 may include a character or characters which indicate that the symbol is an image reading instruction symbol which when read by reader 10, result in the reader commencing an image data reading in accordance with the invention. A second data field 312 may indicate an image reading parameter such as pixel resolution of a constructed secondary bit map representation of an image reading region. A third field 314 may indicate another image reading parameter such as image depth. For example, the number 0 encoded in field 314 may indicate a binary image depth, while the number 3 encoded in field 314 may indicate an 8 bit gray scale. Fourth and fifth data fields 316 may indicate the relative position of the center of the data reading region to the center of the image reading instruction symbol. For example, field 318 may indicate a signed distance in the x dimension between the center of the symbol and the center of the image reading region, while field 320 may indicate a signed distance in the y dimension between the center of the symbol and the center of the image reading region. Sixth and seventh fields 322 may indicate the dimension of the image data reading region. For example, field 324 may indicate a height of an image data reading region, while field 326 may indicate a width of an image data reading region. Further data fields may be provided to indicate additional image data reading parameters or image data output parameters.

Figure 6A:
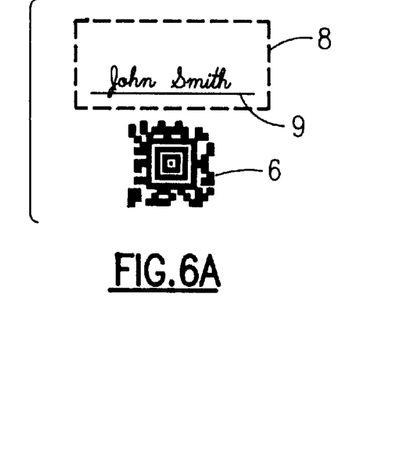
FIGS. 6A, 6B, and 6C illustrate various implementations of the invention.
Figure 6B:
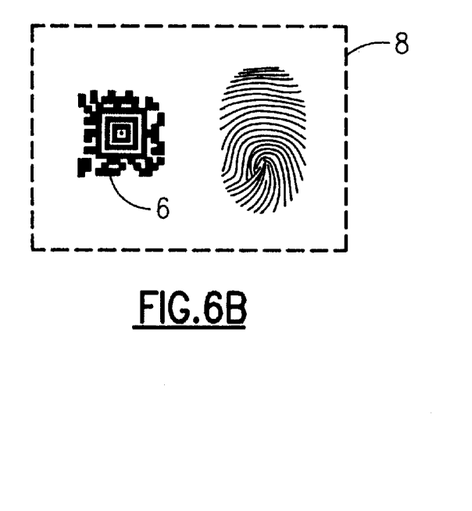
Figure 6C:
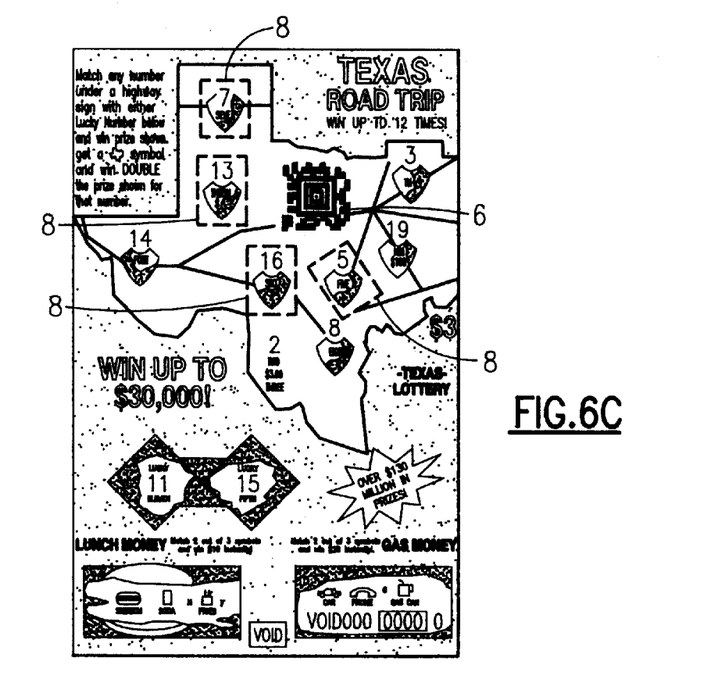

FIGS. 6A through 6C illustrate possible uses of the present invention. FIG. 6A illustrates an implementation of the invention for use in capturing a signature field. In this embodiment, an image reading instruction symbol 6 is disposed on a substrate, and reading of the symbol causes image data corresponding to scene region 8 containing a signature field 9 to be read. In this embodiment, it is typical to output the image data from or calculated from an image data reading region for optical character recognition (OCR) processing, or for a validity check processing wherein the validity of the signature contained in the image data reading region is verified. FIG. 5B illustrates implementation of the invention for fingerprint capture. In this embodiment, reading of image reading instruction symbol 6 formed on a substrate causes image data pertaining to a region of a scene containing a fingerprint field to be read. The image data reading region including the fingerprint representation is then either output to a display apparatus for visual analysis, or else output to a memory space for use in a processing algorithm for determining the identity of a person making the fingerprint. In the embodiment of FIG. 5C reading of image reading instruction symbol 6 causes image data corresponding to various scene regions 8 contained in a lottery game board having scratch regions to be read. The image data corresponding to regions 8 can then be output, for example, to determine if any of the scratch regions have been played.

An important advantage of the present invention in certain embodiments is that captured images of image data reading regions can be output to actual size, to a proper orientation, and with distortion of the captured image corrected, regardless of the distance, orientation, or angle of a reader to an image reading instruction symbol formed in accordance with the invention, and regardless the position of the symbol 6 in relation to a scene region desired to be captured and output.

While the present invention has been described with reference to a number of specific embodiments in order to set forth the best mode thereof, it will be understood that the sprit and scope of the present invention should be determined with reference to the following claims.

What is claimed is:

1. A system for processing image data corresponding to a scene, said system comprising:
    an image reading instruction symbol;
    an imaging assembly for outputting image information;
    a memory space;
    capturing means in communication with said imaging assembly for capturing and storing in said memory space a first bit map representation of a scene including said image reading instruction symbol, said first bit map comprising image data;
    determining means responsive to said image reading instruction symbol for determining an image data reading region in said first bit map representation; and
    means for preferentially reading image data from within said image data reading region relative to image data not in said image data reading region.

2. The system of claim 1, wherein said image reading instruction symbol includes an image data reading parameter indicator structure.

3. The system of claim 1, wherein said image reading instruction symbol includes an image data output parameter indicator structure.

4. The system of claim 1, wherein said image reading instruction symbol includes dimension indicator means for indicating a dimension of said image data reading region determined by said determining means.

5. The system of claim 1, wherein said image reading instruction symbol includes
    dimension indicator means for indicating a dimension of said image data reading region determined by said determining means; and
    position indicator means for indicating a position of said image data reading region determined by said determining means.

6. The system of claim 1, wherein said image reading instruction symbol includes identification indicator means for indicating an identification of said symbol and wherein said memory space has stored thereon dimension indicator means determinable based on said identification indicator means for indicating a dimension of said image data reading region.

7. The system of claim 6, wherein said memory space further has stored thereon position indicator means determinable based on said identification indicator means for indicating a position in relation to said captured image reading instruction symbol of said image data reading region.

8. The system of claim 1, wherein said image reading instruction symbol and said determining means are configured so that said determining means determines at least one imaging characteristic of said image reading instruction symbol, and wherein said image data reading means reads said image data of said image data reading region in a manner that depends on said at least one imaging characteristic.

9. The system of claim 8, wherein said at least one imaging characteristic is a scaling characteristic.

10. The system of claim 8, wherein said at least one imaging characteristic is a distortion characteristic.

11. The system of claim 8, wherein said at least one imaging characteristic is an orientation characteristic.

12. The system of claim 1, wherein said reading means includes secondary bit map construction means for constructing a secondary bit map representation of indicia represented in said image data reading region and wherein said image reading instruction symbol includes gray scale depth indicator means for controlling a gray scale depth of said secondary bit map representation.

13. The system of claim 1, wherein said reading means includes secondary bit map construction means for constructing a secondary bit map representation of indicia represented in said image data reading region wherein said image reading instruction symbol includes pixel resolution indicator means for controlling a pixel resolution of said secondary bit map representation.

14. The system of claim 1, further comprising feedback indicia means responsive to said captured first bit map representation, for indicating to a user that said imaging assembly should be moved when said determining means determine that said image data reading region is not included in said first bit map representation.

15. The system of claim 1, further comprising feedback indicia means responsive to said captured first bit map representation, for indicating to a user a direction in which said imaging assembly should be moved so that a next captured first bit map representation includes said image data reading region, when said determining means determines that said image data reading region is not included in said first bit map representation.

16. The system of claim 1, wherein said first bit map representation is an initial bit map representation.

17. A system for processing image data corresponding to a scene, said system comprising:
    an image reading instruction symbol;
    an imaging assembly for outputting image information; and
    a controller in communication with a memory space, said controller being adapted to
        capture in said memory space first bit map representation of a scene including said image reading instruction symbol;
        determine in response to said image reading instruction symbol an image data reading region in said first bit map representation; and
        preferentially read image data within said image data reading region relative to image data not in said image data reading region.

18. The system of claim 17, wherein said image reading instruction symbol includes dimension indicator means for indicating a dimension of said image data reading region determined by said determining means.

19. The system of claim 17, wherein said image reading instruction symbol includes:
    dimension indicator means for indicating a dimension of said image data reading region determined by said determining means; and
    position indicator means for indicating a position of said image data reading region determined by said determining means.

20. The system of claim 17, wherein said image reading instruction symbol includes identification indicator means for indicating an identification of said symbol and wherein said memory space has stored thereon dimension indicator means determinable based on said identification indicator means for indicating a dimension of said image data reading region.

21. The system of claim 17, wherein said memory space further has stored thereon position indicator means determinable based on said identification indicator means for indicating a position in relation to said captured image reading instruction symbol of said image data reading region to be read by said controller.

22. The system of claim 21, wherein said at least one imaging characteristic is a scaling characteristic.

23. The system of claim 21, wherein said at least one imaging characteristic is a distortion characteristic.

24. The system of claim 21, wherein said at least one imaging characteristic is an orientation characteristic.

25. The system of claim 17, wherein said image reading instruction symbol and said controller are configured so that said controller determines at least one imaging characteristic of said image reading instruction symbol, and wherein said image data reading means reads said image data of said image data reading region in accordance with said at least one imaging characteristic.

26. The system of claim 17, wherein said controller is further adapted to construct a secondary bit map representation of indicia represented in said image data reading region.

27. The system of claim 17, wherein said controller is further adapted to construct a secondary bit map representation of indicia represented in said image data reading region, and wherein said image reading instruction symbol includes a gray scale depth indicator for controlling a gray scale depth of said secondary bit map representation.

28. The system of claim 17, wherein said controller is further adapted to construct a secondary bit map representation of indicia represented in said image data reading region, and wherein said image reading instruction symbol includes a pixel resolution indicator for controlling a pixel resolution of said secondary bit map representation.

29. The system of claim 17, further comprising feedback indicia means responsive to said captured first bit map representation, for indicating to a user that said imaging assembly should be moved when said determining means determines that said image data reading region is not included in said first bit map representation.

30. The system of claim 17, further comprising feedback indicia means responsive to said captured first bit map representation, for indicating to a user a direction in which said imaging assembly should be moved so that a next captured first bit map representation includes said image data reading region, when said determining means determines that said image data reading region is not included in said first bit map representation.

31. The system of claim 17, wherein said first bit map representation is an initial bit map representation.

* * * * *